United States Patent [19]
Latta

[11] Patent Number: 5,784,829
[45] Date of Patent: Jul. 28, 1998

[54] FISHING BOBBER

[76] Inventor: Charles H. Latta, 235 Aspen Dr., Birmingham, Ala. 35209

[21] Appl. No.: 779,756

[22] Filed: Jan. 7, 1997

[51] Int. Cl.$^6$ .................................................. A01K 93/02
[52] U.S. Cl. ............ 43/44.91; 43/44.87; 43/44.9; 43/44.92; 43/44.93
[58] Field of Search ..................... 43/44.9, 44.91, 43/44.87, 44.92, 44.93, 44.94

[56] References Cited

U.S. PATENT DOCUMENTS

| | | |
|---|---|---|
| 402,231 | 4/1889 | Coles et al. |
| 786,597 | 4/1905 | Picken . |
| 1,547,746 | 7/1925 | Gore .................................. 43/44.91 |
| 2,500,078 | 3/1950 | Ingram ............................... 43/44.91 |
| 2,509,704 | 5/1950 | Streitwieser ........................ 43/44.9 |
| 2,587,190 | 2/1952 | Merriweather ...................... 43/44.9 |
| 2,712,194 | 7/1955 | Stefano ............................... 43/44.91 |
| 2,741,865 | 4/1956 | Devoti . |
| 2,745,206 | 5/1956 | Gaw . |
| 2,807,907 | 10/1957 | Brite .................................. 43/44.91 |
| 2,931,124 | 4/1960 | Johnston ............................ 43/44.9 |
| 3,686,787 | 8/1972 | Milovich ............................ 43/44.9 |
| 3,736,690 | 6/1973 | Witkowski ......................... 43/44.9 |
| 3,803,749 | 4/1974 | Boyum ............................... 43/44.9 |
| 3,990,172 | 11/1976 | Hagquist ............................ 43/44.87 |
| 4,300,304 | 11/1981 | Maycock et al. ................... 43/44.87 |
| 4,418,492 | 12/1983 | Rayburn ............................. 43/44.9 |
| 4,477,996 | 10/1984 | Walter ................................ 43/43.14 |
| 5,241,774 | 9/1993 | Rayburn ............................. 43/44.9 |

*Primary Examiner*—Michael J. Carone
*Assistant Examiner*—Darren Ark
*Attorney, Agent, or Firm*—Veal & Associates

[57] ABSTRACT

An improved fishing bobber having a light weight quill portion with a stop at a lower end thereof and a denser portion which fits over the quill and abuts the stop. The denser portion has sufficient weight to facilitate casting the line but has enough buoyancy to float at approximately the water surface. Moreover, during a cast, the denser portion helps to maintain the quill portion in an orientation amenable for casting. In the water, an upper end of the quill portion will situate above the water surface as a signal to the fisherman. The quill portion is slidable within the denser portion such that as a fish strikes the bait, the quill portion will move downward with the fishing line without dragging along the denser portion, thus the fish does not feel any drag from the denser portion.

9 Claims, 3 Drawing Sheets

5,784,829

1

FISHING BOBBER

FIELD OF THE INVENTION

The present invention relates to fishing equipment. More particularly, the present invention relates to an improved fishing bobber.

BACKGROUND OF THE INVENTION

Fishing bobbers of various design and construction are known in the art. In the past, fishing bobbers have typically been comprised of a light weight material so that the bobbers would float on the surface of the water. However, these light weight bobbers do not facilitate casting of the fishing line. Commonly, weights are attached to the line to facilitate casting without impeding the bobber from floating. Another solution has been to design bobbers with greater density to facilitate casting. These bobbers should have enough weight to facilitate casting yet still float at the water surface.

A problem with heavier fishing bobbers is the inertial drag that results on the line. This drag gives an unnatural feel when the fish strikes the bait. Additionally, as a fish strikes the bait, the inertial drag can pull the bait from the mouth of the fish so that by the time the fisherman responds to the bobber signal and tensions the line, the bait is no longer in the mouth of the fish. What is needed is a fishing bobber which has the weight to facilitate casting yet is designed such that a fish striking the line will not feel the inertial drag from the bobber.

SUMMARY OF THE PRESENT INVENTION

It is an object of the present invention to provide an improved fishing bobber which has sufficient weight to facilitate casting.

It is another object of the present invention to provide a fishing bobber which does not significantly increase inertial drag on the line when struck by a fish.

These and other objects of the present invention are accomplished with an improved fishing bobber having a light weight quill portion with a stop at a lower end thereof and a denser portion which fits over the quill and abuts the stop. The denser portion has sufficient weight to facilitate casting the line but has enough buoyancy to float at approximately the water surface. Moreover, during a cast, the denser portion helps to maintain the quill portion in an orientation amenable for casting. In the water, an upper end of the quill portion will situate above the water surface as a signal to the fisherman. The quill portion is slidable within the denser portion such that as a fish strikes the bait, the quill portion will move downward with the fishing line without displacing the denser portion, thus the fish does not feel any inertial drag from the denser portion.

These and other objects and advantages of the invention will become apparent from the following detailed description of the preferred embodiment of the invention.

BRIEF DESCRIPTION OF THE DRAWINGS

A fishing bobber embodying features of the invention is described in the accompanying drawings which form a portion of this disclosure and wherein.

2

Figure 3:
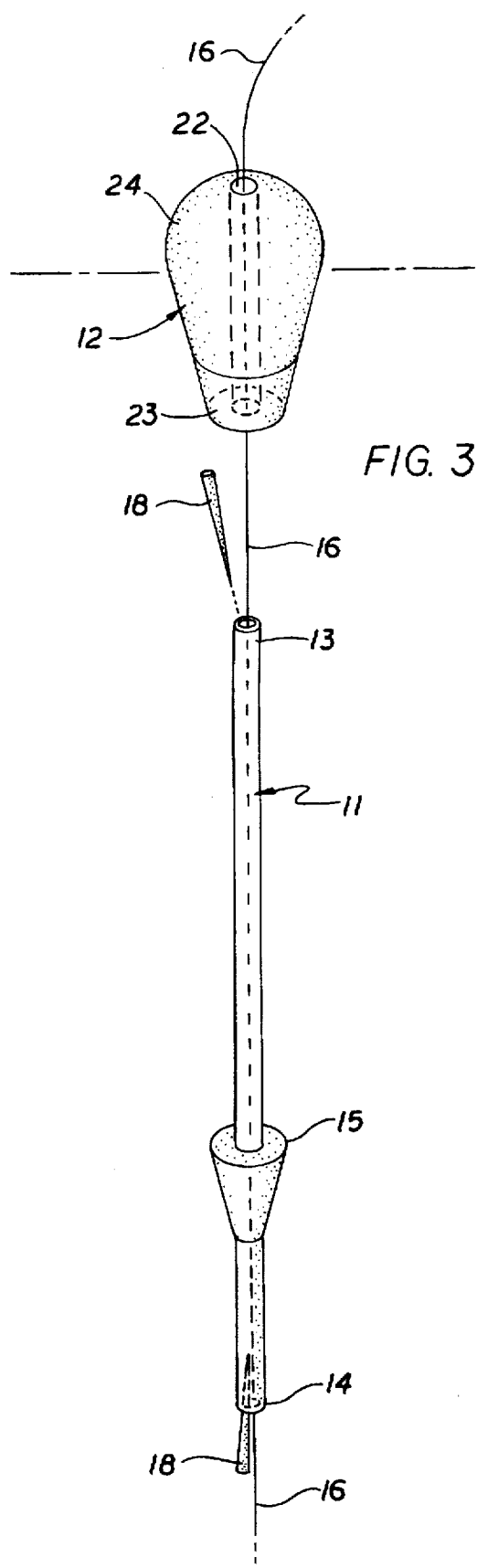

FIG. 3 is a perspective view of the bobber on a fishing line showing the two portions separated.

Figures 4, 5:
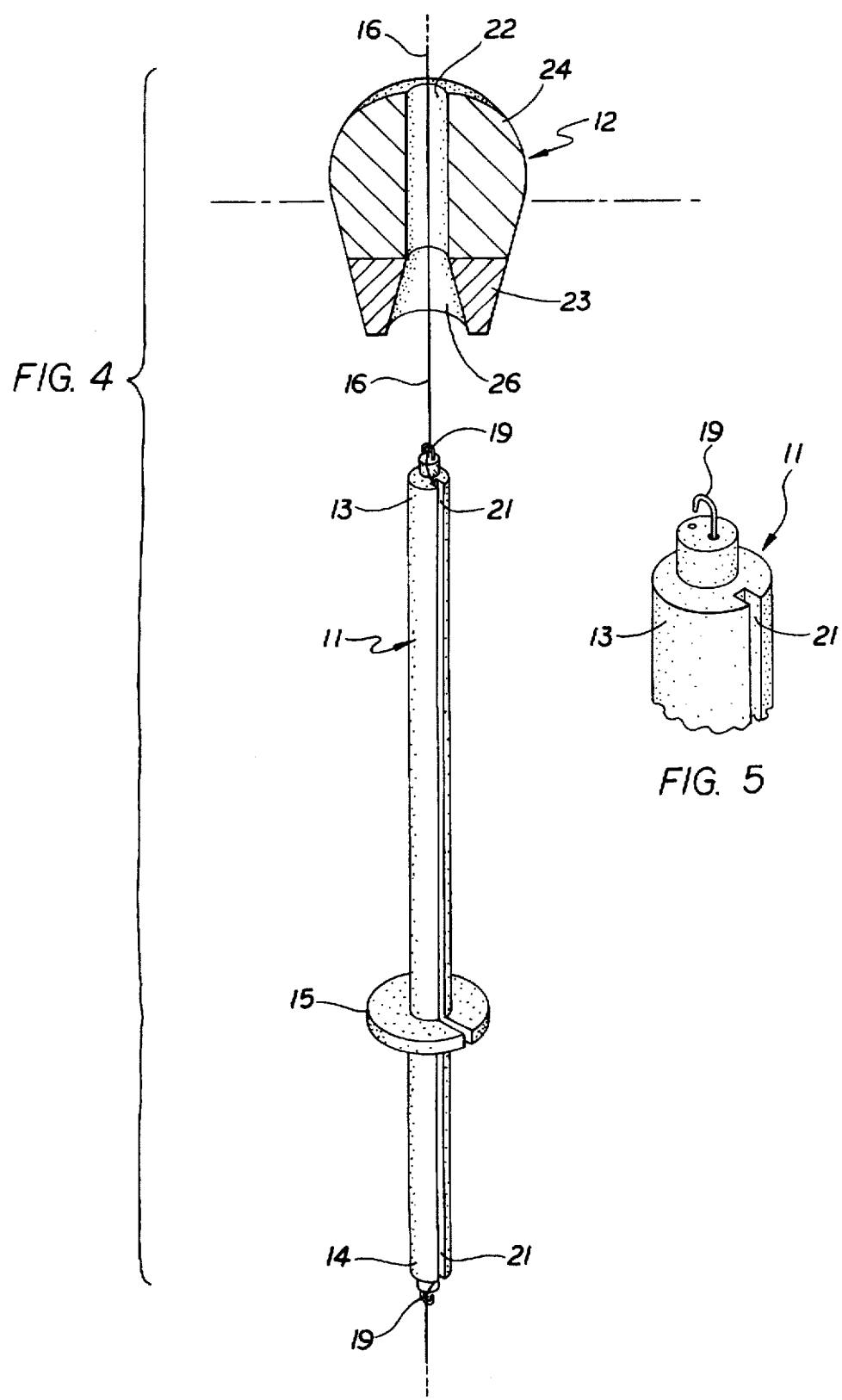

FIG. 4 is a perspective view of an alternate embodiment of the bobber on a fishing line showing the two portions separated with the weighted member shown in section.

FIG. 5 is an enlarged perspective view of the spring clip of FIG. 4.

DETAILED DESCRIPTION OF THE PREFERRED EMBODIMENT

A more complete understanding of the invention may be obtained by reference to the accompanying drawings wherein the bobber, according to the preferred embodiment, comprises a shaft 11 and a weighted member 12. Shaft 11, commonly referred to as a quill, is preferably an elongated hollow structure comprising an upper end 13 and a lower end 14 having an expanded region 15, such as an annular flange or the like, fixed thereon proximal lower end 14. Shaft 11 is preferably comprised of a lightweight, buoyant material, such as a lightweight plastic. A fishing line 16 is run through shaft 11 and secured thereto by stops 17, which may be weights, wedge pin 18, or any other appropriate means. The important object is to attach shaft 11 to fishing line 16 for movement therewith. Shaft 11 can also be solid, as illustrated in FIG. 4. In this embodiment, shaft 11 would preferably have spring clips 19, best shown in FIG. 5, mounted on each end for fixedly holding the shaft to fishing line 16. Additionally, shaft 11 can have an optional longitudinal groove 21 down the length thereof for placement of fishing line 16.

Weighted member 12 is also buoyant, however it is denser than shaft 11 such that it floats lower than shaft 11. Weighted member 12 has an axial opening 22 therethrough for receiving upper end 13 of shaft 11 therein. Expanded region 15 acts as a stop to limit relative movement of weighted member 12 in the direction of lower end 14. Weighted member 12 preferably comprises two regions, with a lower region 23 having a greater density than an upper region 24 such that weighted member 12 floats generally perpendicular to the surface of the water. This helps to maintain the bobber in an upright position. Additionally, lower region 23 can have a conical indentation 26 therein to facilitate the insertion of upper end 13 of shaft 11 into opening 22. The key to successful manufacture and use of the bobber is the proper selection of the mass and density of shaft 11 and weighted member 12. In other words, inertia is proportional to the mass of an object; thus, weighted member 12 has greater mass than shaft 11 and a slightly greater density or mass/unit volume ratio.

Figure 2:
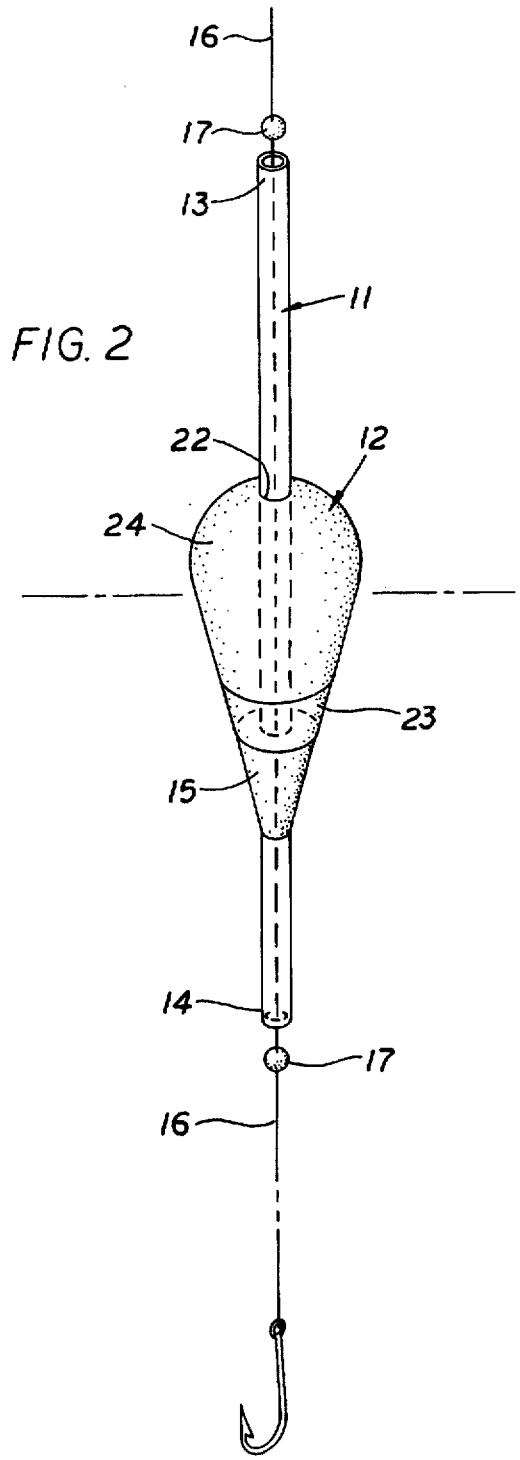
FIG. 2 is a perspective view of the bobber on a fishing line showing the two portions in abutment.

During casting, lower region 23 of weighted member 12 abuts expanded region 15 of shaft 11. Once weighted member 12 is set in motion, its inertia and kinetic energy level is greater than the shaft. Therefore, the greater mass of weighted member 12 controls the orientation of shaft 11 and maintains the shaft oriented longitudinally in the direction of the cast to facilitate casting. That is to say, the weighted member has sufficient weight to promote an effective cast of the fishing line. After landing in the water, the bobber will achieve an orientation substantially as shown in FIG. 2 with upper end 13 of shaft 11 supported above the water surface and upper region 24 of weighted member 12 roughly at the water surface. This orientation should prevail even when the relative buoyancy of the components is not substantially different.

Figure 1:
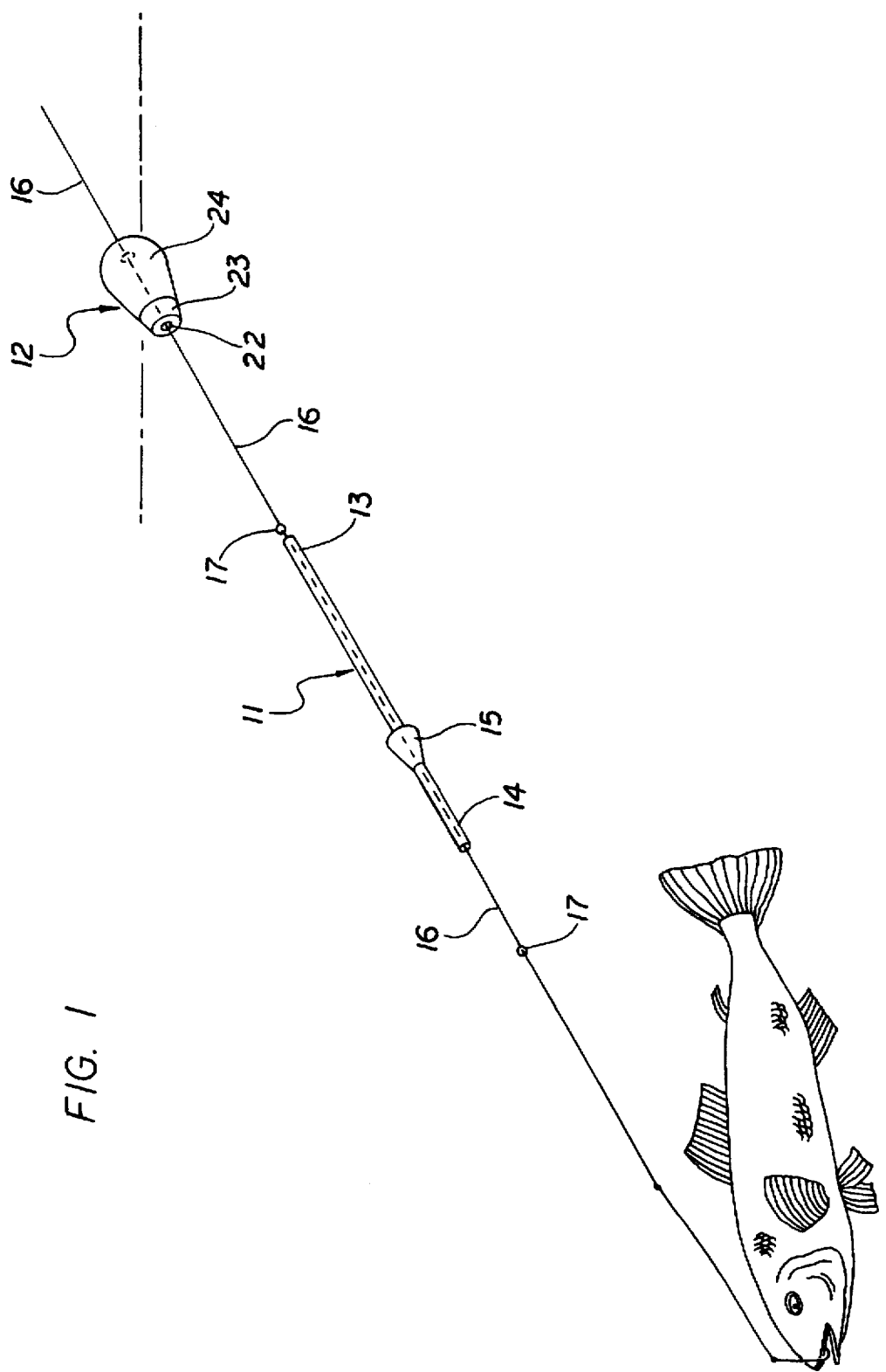
FIG. 1 is a perspective view of the bobber on a fishing line showing the two portions separated as a result of a fish strike.

As a fish strikes the bait, fishing line 16 and shaft 11 are concomitantly pulled toward the fish. Since weighted member 12 is not fixed to shaft 11, the fish does not have to overcome the inertia of its mass to move shaft 11. Thus, weighted member 12 may become separated from shaft 11 and remain at the water surface, shown in FIGS. 1, 3, and 4, and the fish does not feel any inertial drag from weighted member 12. The downward motion of the shaft signals the fisherman that a strike has occurred. Should shaft 11 separate from weighted member 12, the fisherman need only pull the line which brings upper end 13 of shaft 11 back through opening 22 of weighted member 12. Conical indention 26, if present, facilitates upper end 13 moving back through opening 22.

It is to be understood that the form of the invention shown is a preferred embodiment thereof and that various changes and modifications may be made therein without departing from the spirit of the invention or scope as defined in the following claims.

Having set forth the nature of the invention, what is claimed is:

1. A fishing bobber assembly for use in combination with a fishing line, comprising:

a) means for indicating movement of said fishing line, wherein said indicating means is secured to said fishing line for substantially concomitant movement therewith, said indicating means comprising an elongated buoyant material having a longitudinal axis and an upper portion and a lower portion wherein said upper portion tends to float above the surface of water, said indicating means further comprising blocking means formed on said lower portion thereof; and b) means for slidably engaging said indicating means relative to said longitudinal axis, said engaging means having an axial bore therethrough for receiving said upper portion of said indicating means therein, wherein a diameter of said axial bore is less than a diameter of said blocking means such that said engaging means cannot slide thereover, said engaging means comprising a buoyant material such that said engaging means tends to float at the water surface, wherein said buoyant material has a buoyancy less than the buoyancy of said indicating means such that during casting of said fishing line, said engaging means will slide along said longitudinal axis in a first longitudinal direction to abut said blocking means to impart greater inertial mass to said indicating means, wherein said engaging means offers no resistance to movement of said indicating means in a second longitudinal direction opposite said first longitudinal direction such that said indicating means can become easily disengaged from said engaging means when said indicating means is pulled in said second longitudinal direction such that said engaging means remains at the water surface.

2. A fishing bobber assembly according to claim 1 wherein said engaging means has a lower region and an upper region wherein said lower region has a greater mass than said upper region to maintain said indicating means in a substantially vertical orientation when the assembly is in water.

3. A fishing bobber assembly according to claim 1 wherein said blocking means comprises a flange.

4. A fishing bobber assembly according to claim 1 wherein said engaging means has a conical indention formed in a lower end thereof to facilitate the insertion of said upper portion of said indicating means into said axial bore.

5. A fishing bobber assembly according to claim 1 wherein said indicating means is secured to said fishing line by at least one clip affixed to an end of said indicating means to prevent movement of said fishing line relative to said indicating means.

6. A fishing bobber assembly according to claim 5 wherein said indicating means has a longitudinal groove along the length thereof for receiving said fishing line therein.

7. A fishing bobber assembly according to claim 1 wherein said indicating means has an axial passage therethrough for receiving said fishing line therein.

8. A fishing bobber assembly according to claim 7 wherein said indicating means is secured to said fishing line by at least one wedge pin plugged into an end of said indicating means to prevent movement of said fishing line relative to said indicating means.

9. A fishing bobber assembly according to claim 7 wherein said indicating means is secured to said fishing line by a pair of weights, one of said weights affixed to said fishing line adjacent one end of said indicating means and the other weight affixed to said fishing line adjacent the opposite end of said indicating means such that said weights collectively prevent movement of said fishing line relative to said indicating means.

* * * * *